United States Patent
Mirskiy

(10) Patent No.: US 7,200,015 B1
(45) Date of Patent: Apr. 3, 2007

(54) AUTOMATIC CAPACITOR DISCHARGE FOR POWER SUPPLIES

(75) Inventor: Gregory Mirskiy, Buffalo Grove, IL (US)

(73) Assignee: La Marche Manufacturing Co., Des Plaines, IL (US)

(*) Notice: Subject to any disclaimer, the term of this patent is extended or adjusted under 35 U.S.C. 154(b) by 275 days.

(21) Appl. No.: 10/843,498

(22) Filed: May 10, 2004

(51) Int. Cl.
*H02M 1/14* (2006.01)

(52) U.S. Cl. .......................... 363/47; 363/53
(58) Field of Classification Search ................. 361/15, 361/58; 363/47, 48, 52, 53, 84, 125, 126
See application file for complete search history.

(56) References Cited

U.S. PATENT DOCUMENTS

| | | | | |
|---|---|---|---|---|
| 4,275,436 A | * | 6/1981 | Peterson | 363/47 |
| 4,449,177 A | * | 5/1984 | Kozai et al. | 363/126 |
| 4,962,354 A | * | 10/1990 | Visser et al. | 323/360 |
| 5,426,579 A | * | 6/1995 | Paul et al. | 363/126 |
| 6,301,131 B1 | * | 10/2001 | Yoshida | 363/44 |

OTHER PUBLICATIONS

QuicklyDischarge Power-Supply Capacitors; Electronic Design News, Jul. 5, 2001 edition, p. 132;Stephen Woodward; University of North Carolina, Chapel Hill, NC.

* cited by examiner

*Primary Examiner*—Jeffrey Sterrett
(74) *Attorney, Agent, or Firm*—Thomas E. Hill; Wildman Harrold Allen & Dixon

(57) ABSTRACT

In a DC power supply or a battery charger, plural output filter capacitors remain highly charged after the load is removed and the converter is turned off. A transistor connected across the capacitors is non-conductive during normal power supply operation and a bleed resistor connecting the transistor to the output capacitors is not in the circuit during normal power supply operation. When the power supply is turned off and the load is removed, the transistor is automatically rendered conductive with the removal of the pulsed output of the power supply's power transformer to the transistor, with the energy stored in the capacitors safely and quickly discharged to the output return via the bleed resistor which is placed in circuit by the conducting transistor.

6 Claims, 3 Drawing Sheets

AUTOMATIC CAPACITOR DISCHARGE FOR POWER SUPPLIES

FIELD OF THE INVENTION

This invention relates generally to power supplies and battery chargers and is particularly directed to an arrangement for automatically and safely discharging a high voltage charge stored in the output filter capacitors of a power supply to essentially zero potential when the load is removed or the power supply is turned off.

BACKGROUND OF THE INVENTION

Power supplies of various types are widely used in electronics and can be found in literally any electronic device. Many of these power supplies produce a high voltage output and are capable of driving hazardous voltages and current. Unless special provision is made, these power supplies can retain a large voltage in their output filter capacitors even when the power supply is turned off or the output load is removed. The energy stored in the output filter capacitors is given by the expression $$\text{Energy} = \frac{CV^2}{2}, \text{ where}$$

$C$ = the capacitance, and $V$ = the output voltage.

This energy is typically measured in tens of joules and can reside on unloaded electrolytic filter capacitors for hours or even days. This large residual charge at high voltage poses a significant hazard to service and operating personnel, as well as to the power supply itself and associated equipment.

One approach to resolving this problem is shown in the schematic diagram of FIG. 1, where a 120V AC input is provided via a switch 72 and power transformer 74 to a rectifying bridge 76 in a DC power supply 70. The output filter capacitors are shown in simplified form as capacitor 78 connected across the power supply's output terminals 82*a* and 82*b*. In this approach, a bleed resistor 80 is also connected across the output terminals 82*a*, 82*b* for dissipating the residual charge on the output capacitors. The primary problem with this approach is the presence of the bleed resistor 80 in the circuit during operation of the DC power supply 70, resulting in substantial energy dissipation via the bleed resistor.

Another approach to discharging the output filter capacitors of a DC power supply 90 is shown in FIG. 2. In this approach, the otherwise-unused off-throw contacts 94*a* and 94*b* of a double pole double throw (DPDT) on/off power switch 92 are used to discharge the output filter capacitors, which are shown in FIG. 2 as a single capacitor 100 for simplicity. An input current is provided via the DPDT on/off power switch 92 to a power transformer 102, the output of which is rectified by a bridge 104. When the DPDT on/off power switch 92 is moved to the off position, it establishes a discharge path 96 through first and second resistors 98*a*, 98*b* and the primary winding 102*a* of the power transformer 102. The energy stored in the output filter capacitors 100 is rapidly dumped. In this approach, the first and second resistors 98*a*, 98*b* in the turn-off discharge path are only in the circuit when the DC power supply 90 is turned off, and thus do not reduce the efficiency of the power supply during operation. However, this approach requires a complicated switching arrangement at the input of the DC power supply. The approaches to discharging the power supply output filter capacitors of FIGS. 1 and 2 are described in the Jul. 5, 2001 edition of Electronic Design News, in an article entitled "Quickly Discharge Power-Supply Capacitors", by Stephen Woodward, page 132.

Other approaches to dissipating the charge on the output filter capacitors employ a manually operated switch for discharging this energy when the converter is turned off or the output load is removed. This latter approach is, of course, not automatic. Other approaches are automatic in operation, but require additional circuitry in the power supply, resulting in a more complicated arrangement and require circuitry for interfacing the power supply with the energy discharge circuit. Moreover, modern high power supply modules are hot unpluggable and therefore have no mechanical power switches.

The present invention addresses the aforementioned limitations of the prior art by providing a power supply with a device, which rapidly and automatically provides for the full discharge of energy stored in the power supply's output filter capacitors. The device includes a combination of a switching transistor and bleed resistor which are not in circuit during normal operation of the power supply, but are automatically switched in circuit when the power supply input is turned off and the output load is removed from the converter to fully discharge the output filter capacitors. The discharge circuit is integral with the power supply and does not itself reduce the efficiency of the converter during normal power supply operation. While disclosed primarily in terms of use in a soft switching power supply, i.e., where switching occurs at essentially zero voltage, the present invention is applicable for use in any type of switching and linear power supply.

OBJECTS AND SUMMARY OF THE INVENTION

Accordingly, it is an object of the present invention to avoid hazardous operating conditions in a high voltage power supply or battery charger by quickly and automatically discharging residual high voltage charge.

It is another object of the present invention to provide for the automatic, safe and rapid discharge of output filter capacitors in a power supply when the load is removed and the power supply is turned off without increasing the load during normal power supply operation.

Yet another object of the present invention is to provide for the high voltage discharge of post rectification filter capacitors in a power supply at turn-off for improved human safety and equipment protection.

The present invention contemplates apparatus for converting a first DC or AC input voltage to a second DC output voltage. The apparatus comprises: a power transformer having primary and secondary windings, wherein an input alternating current is provided to the primary winding and an output alternating voltage is induced in the secondary winding; a rectifier circuit coupled to the secondary winding for converting the output alternating voltage to a DC output voltage waveform; output capacitors and a bleed resistor forming an output filter coupled between the rectifier circuit and output terminals of the apparatus for filtering the DC output voltage pulses prior to providing the DC output voltage pulses via the output terminals to a DC load, wherein the output capacitors are charged to a high voltage by the DC output voltage pulses; and a transistor switch connecting the output capacitors and bleed resistor to an output return, wherein the transistor switch is non-conductive during normal operation of the apparatus and the transistor switch is rendered conductive for automatically discharging the output capacitors via the bleed resistor to the output return when the apparatus is turned off and the DC load is removed from the apparatus.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
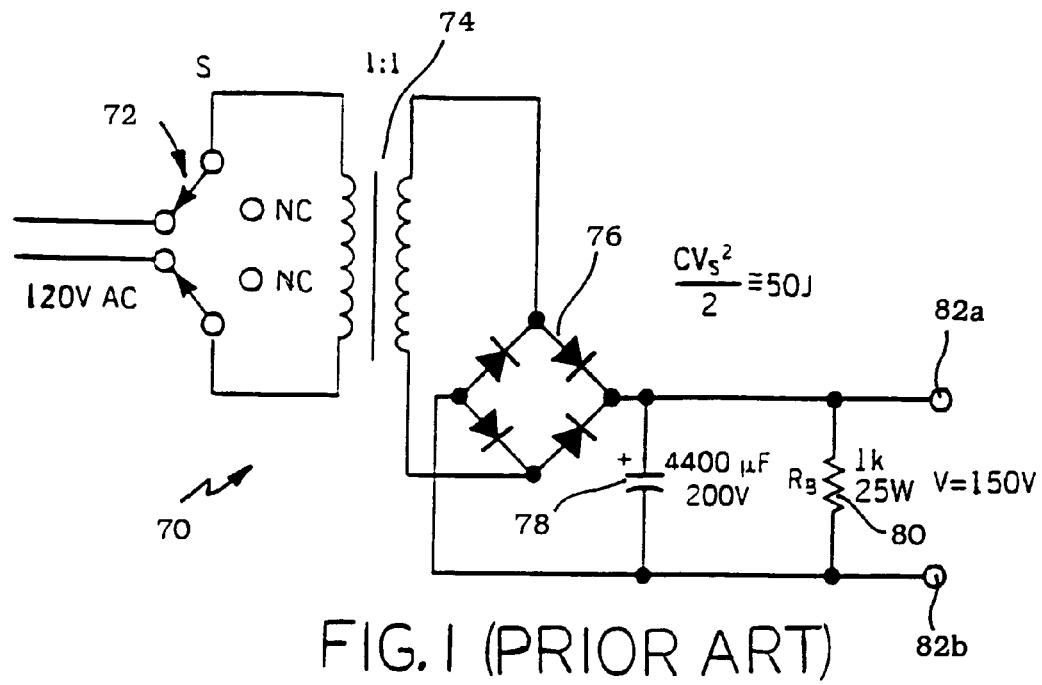
FIG. 1 is a simplified schematic diagram of a prior art approach incorporating a bleed resistor for discharging output filter capacitors in a DC power supply.
Figure 2:
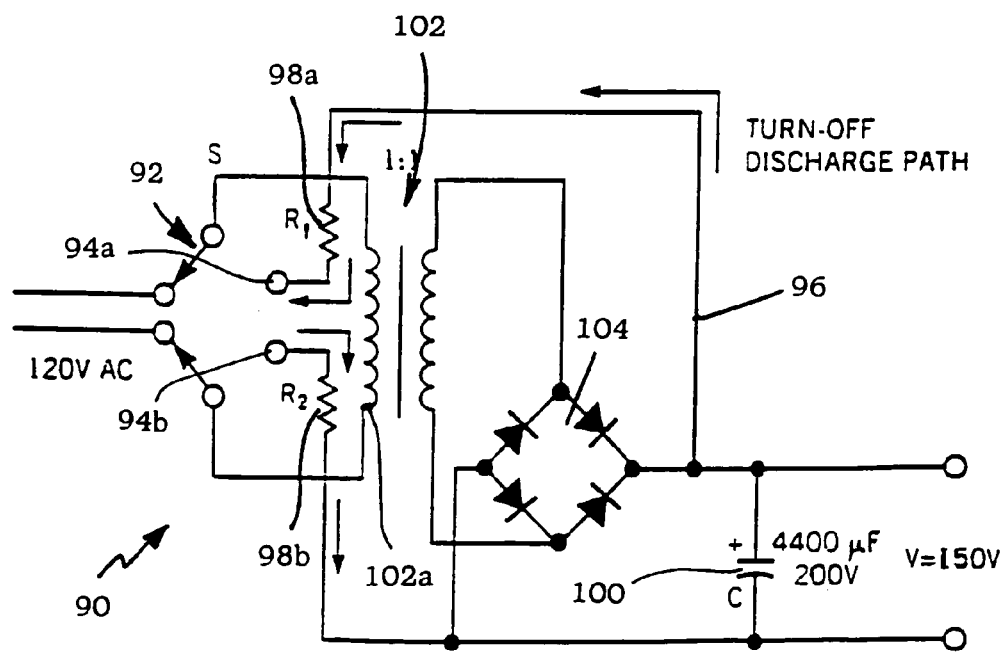
FIG. 2 is another prior art approach for discharging the energy stored in output filter capacitors of a DC power supply employing a power supply turn-off discharge path for rapidly dumping the energy stored in the output filter capacitors.
Figure 3:
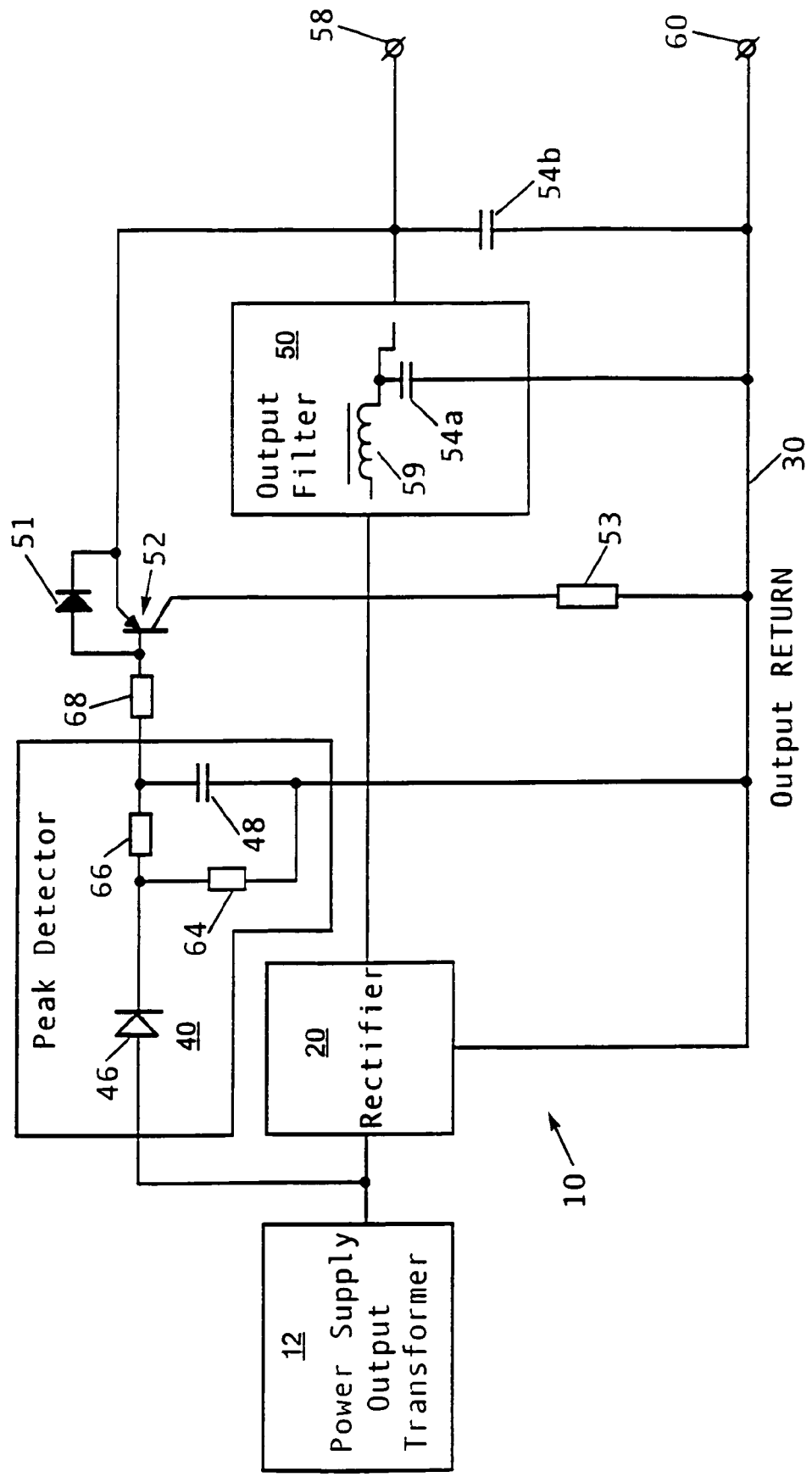
FIG. 3 is a simplified combined schematic and block diagram of a power supply incorporating an arrangement for the automatic, quick discharge of energy stored in the converter's output filter capacitors in accordance with the present invention.

Referring to FIG. 3, there is shown a schematic diagram of a power supply 10 with automatic output filter capacitor discharge in accordance with the principles of the present invention. The inventive power supply 10 is intended for use in a DC power supply where a DC or AC input voltage is converted to a DC output voltage. These types of DC power supplies are used in various applications such as in battery chargers, telecommunications systems, motor drives, etc. However, the inventive capacitor discharge arrangement is not limited to the specific power supply arrangement disclosed herein, but is applicable to virtually any type of DC output device incorporating output filter capacitors which remain charged after the converter is turned off and the output load is removed.

Power supply 10 includes an output transformer 12 which may be either a line transformer of a linear power supply or an output transformer of a switching power supply. Power supply 10 further includes a rectifier circuit 20 and a peak detector circuit 40. Transformer 12 includes a secondary winding (not shown for simplicity) connected to both the rectifier circuit 20 and the peak detector circuit 40. The secondary side voltage of transformer 12 is rectified by either a center tap or full wave bridge configuration in the rectifier circuit 20. The output of rectifier circuit 20 is a sequence of unipolar DC pulses.

Once power supply 10 is turned off and the output load is disconnected, its output filter capacitors 54a and 54b remain highly charged. It should be noted that both output capacitors 54a and 54b may be within the power supply's output filter 50, or only one of these capacitors may be within the output filter as shown for the case of capacitor 54a in FIG. 3. Output capacitors 54a, 54b are capable of storing the output voltage for an extended period of time. Any person touching or any object contacting the output terminals 58 and 60 of power supply 10 would receive a large electrical shock when the output load is no longer present. In accordance with the present invention, a PNP switching transistor 52 is coupled across the output lines for providing the filter capacitors 54a and 54b with a discharge path to an output return 30 via a bleed resistor 53 for safety reasons when the power supply 10 is turned off and the output load is removed from the power supply. This safety feature of power supply 10 operates in the following manner.

During normal power supply 10 operation, voltage generated by the secondary winding of transformer 12 is provided to rectifier circuit 20 and peak detector circuit 40. Peak detector circuit 40 includes resistors 64 and 66, diode 46 and capacitor 48. Resistor 66 in combination with capacitor 48 also forms a filter for the rectified output of diode 46. This rectified, filtered output voltage has a value equal to the maximum value of the voltage waveform at the output of transformer 12 and is provided to the base of PNP transistor 52 via resistor 68. The emitter of transistor 52 is maintained at the root-mean-square (RMS) value of the rectified output voltage of power supply 10, while the base of the transistor is maintained at the peak output voltage of diode 46 during normal power supply operation. With the base of transistor 52 maintained at a higher voltage than its emitter during normal operation of the power supply 10, the transistor is off and thus not providing a bleeding path to the circuit during normal power supply operation.

In the event the power supply 10 is turned off and its output load is removed, the high voltage on the base of transistor 52 is first removed and the output filter capacitors 54a and 54b maintain a high voltage on the transistor's emitter. Under these conditions, with the base of transistor 52 having a lower voltage than its emitter, the transistor is rendered conductive. With the combination of transistor 52 and resistor 53 connected across the output filter capacitors 54a and 54b, the charge on the capacitors is directed to the output return 30 via bleed resistor 53. The RC time constant of this discharge circuit is preferably selected to provide a maximum discharge time of on the order of a few seconds, and preferably less than five seconds. Because transistor 52 is non-conductive during normal power supply 10 operation and bleed resistor 53 is then not connected in circuit, the overall energy efficiency of power supply 10 is not reduced because of the presence of resistor 53. Diode 51 connected between the base and emitter of transistor 52 protects the transistor by limiting the reverse voltage across the base-emitter junction of the transistor to approximately 0.6 V. Resistor 68 functions to limit current flow and thus protects diode 51 from excessive currents.

Figure 4:
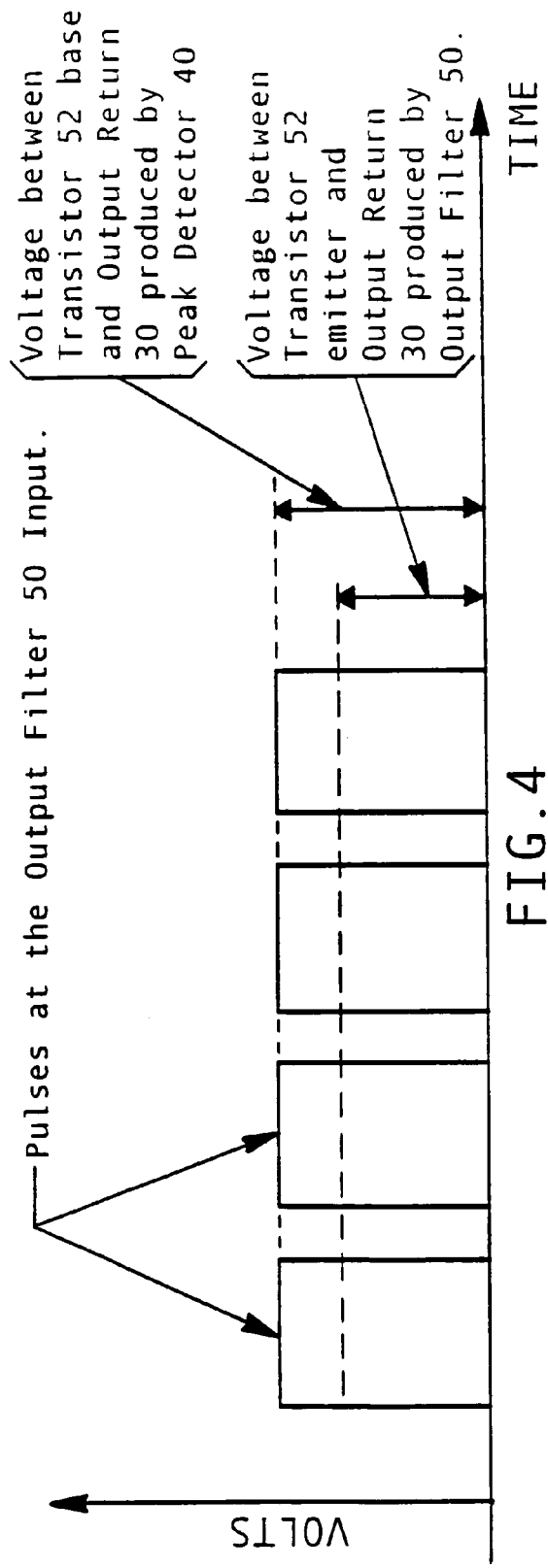
FIG. 4 is a graphic illustration of the voltage waveform at the power supply's rectifier output which is shown as a rectangular waveform, but also may be in the form of a sine wave.

During normal operation, peak detector circuit 40 produces a voltage equal to the amplitude of the pulses at the output of rectifier circuit 20. The output voltage of peak detector circuit 40 is greater, i.e., more positive, than the output voltage of an output filter circuit 50 coupled to rectifier circuit 20, where the output filter derives the root-mean-square (RMS) value from the pulses at the output of the rectifier circuit. The output of the peak detector 40 is provided via resistor 68 to the base of transistor 52, while the output of the output filter 50 is provided to the transistor's emitter. Thus, as discussed above, during normal operation transistor 52 is always off and bleed resistor 53 is not employed in the operation of power supply 10. This can be seen in FIG. 4 which illustrates the series of pulses provided to the input of output filter 50, where the voltage of the pulses represents the voltage between the base of transistor 52 and the output return 30 produced by the peak detector circuit 40. The lower horizontal dotted line shown in FIG. 4 passing through upper portions of each of the pulses represents the voltage between the emitter of transistor 52 and the output return 30 produced by output filter 50. Output capacitors 54a and 54b are charged up to the output voltage. Output filter 50 includes not only capacitor 54a, but also an inductor 59.

Figure 5:
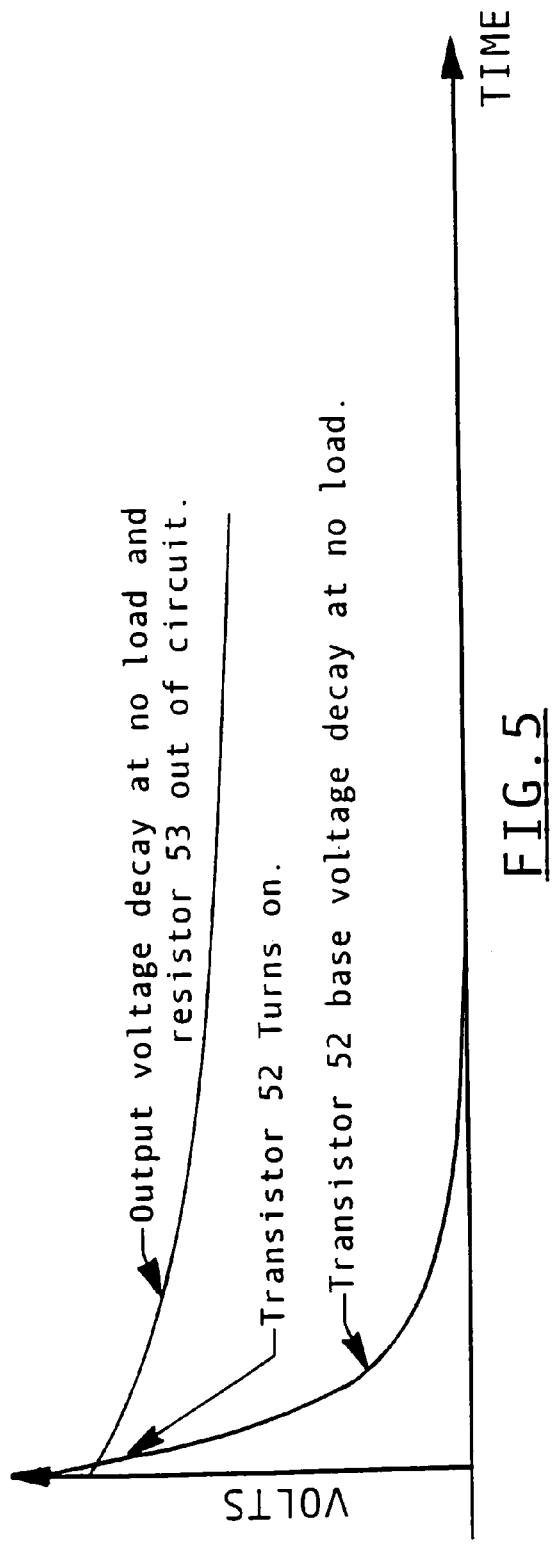
FIG. 5 is a graphic illustration of the change in voltage over time on the terminals of a switching transistor in a power supply incorporating automatic capacitor discharge in accordance with the present invention.

When power supply 10 is unplugged and no load is connected to its output terminals 58a and 60, rectifier circuit 20 no longer produces output pulses. In addition, the voltage at the output peak detector circuit 40 decays abruptly because the capacitance of capacitor 48 is very small, but the output capacitors 54a and 54b maintain a charge because there is no means for bleeding a charge from these capacitors. As a result, the base of transistor 52 goes lower than the emitter of the transistor, rendering the transistor conductive. When transistor 52 is turned on and rendered conductive, bleed resistor 53 is connected to the power supply output and bleeds charge away from capacitors 54a and 54b to the output return 30. This is shown graphically in FIG. 5, where the upper curve represents the decay of the output voltage at no load with bleed resistor 53 performing no function in power supply 10. The lower curve in FIG. 5 represents the voltage decay at the base of transistor 52 under a no load condition. Diode 51 clamps the base-emitter junction of transistor 52 to prevent reverse biasing of the transistor's base-to-emitter junction and maintain the transistor conductive.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for converting a first DC or AC input voltage to a second DC output voltage, said apparatus comprising:
    a power transformer having primary and secondary windings, wherein an input alternating current is provided to said primary winding and an output alternating voltage is induced in said secondary winding;
    a rectifier circuit coupled to said secondary winding for converting said output alternating voltage to DC output voltage pulses;
    an output filter including output capacitors coupled between said rectifier circuit and output terminals of the apparatus for filtering said DC output voltage pulses prior to providing said DC output voltage pulses via said output terminals to a DC load, wherein said output capacitors are charged to a high voltage by said DC output voltage pulses;
    a transistor switch and bleed resistor combination connecting said output capacitors to an output return, wherein said transistor switch is non-conductive during normal operation of the apparatus and said transistor switch is rendered conductive for automatically discharging the output capacitors through the bleed resistor to the output return when the apparatus is turned off and the DC load is removed from the apparatus; and
    a peak detector coupled to the secondary winding of said power transformer and further coupled to said transistor switch via a resistor, wherein said peak detector provides said transistor switch with a peak output voltage pulse from the secondary winding of said power transformer for filtering out peaks of the DC pulses provided to said transistor switch and for maintaining said transistor switch nonconductive during normal operation of the apparatus, and wherein said peak detector compares a maximum value of the output voltage on the secondary winding of said power transformer with a root-mean-square value of said DC output voltage pulses from said output capacitors for providing a sliding threshold level not referenced to a fixed voltage for turning on said transistor switch, and wherein lossy, heat generating components are avoided during operation of the apparatus.

2. The apparatus of claim 1 wherein said bleed resistor is connected in circuit between said transistor switch and the output return and across said output capacitors when said transistor switch is rendered conductive for dissipating a charge on said output capacitors and wherein said resistor is not in circuit with said output capacitors during normal operation of the apparatus.

3. The apparatus of claim 2 further comprising a diode coupled to said transistor switch for limiting the voltage across said transistor switch.

4. The apparatus of claim 3 wherein said transistor switch is a PNP transistor, and wherein said diode is connected across the transistor's emitter-base junction.

5. The apparatus of claim 4 wherein said bleed resistor connects a collector of said PNP transistor to the output return.

6. A power supply for converting a first DC or AC input voltage to a second DC output voltage, said power supply comprising:
    a power transformer having primary and secondary windings, wherein an input alternating current is provided to said primary winding and an output alternating voltage is induced in said secondary winding;
    a rectifier circuit coupled to said secondary winding for converting said output alternating voltage to a first DC output voltage;
    output capacitors coupled to said rectifier circuit for filtering said first DC output voltage and providing said second DC output voltage, wherein said output capacitors are charged to a high voltage by said first DC output voltage;
    a transistor switch coupled to the secondary winding of said power transformer and further coupled across said output capacitors, wherein said transistor switch is rendered non-conductive by said first DC output voltage during normal operation of the power supply and said switch is rendered conductive by an absence of the first DC output voltage when the power supply is turned off and an output load is removed from the power supply for automatically discharging said output capacitors and quickly removing the high voltage from said output capacitors; and a peak detector coupled to the secondary winding of said power transformer and further coupled to said transistor switch via a resistor, wherein said peak detector provides said transistor switch with a peak output voltage pulse from the secondary winding of said power transformer for filtering out peaks of the DC pulses provided to said transistor switch and for maintaining said transistor switch nonconductive during normal operation of the power supply, and wherein said peak detector compares a maximum value of the output voltage on the secondary winding of said power transformer with a root-mean-square value of said DC output voltage pulses from said output capacitors for providing a sliding threshold level not referenced to a fixed voltage for turning on said transistor switch, and wherein lossy, heat generating components are avoided during operation of the power supply.

* * * * *